Sheet 1. 3 Sheets.

J. L. Rolland,
Kneading Dough

Nº 12,217. Patented Jan. 9, 1855.

Witnesses:
W. F. Proctor
J. Meramitty

Inventor
Rolland

Sheet 2. 3 Sheets.

J. L. Rolland,
Kneading-Dough.

N° 12,217.  Patented Jan. 9. 1855.

Witnesses:
W. F. Proctor
J. M. Merritt

Inventor.
Rolland

N. PETERS, PHOTO-LITHOGRAPHER, WASHINGTON, D. C.

Sheet 3. 3 Sheets.

J. L. Rolland,
Kneading Dough.

N° 12,217.  Patented Jan. 9, 1855.

Witnesses:
W. J. Roctor

Inventor
Rolland

UNITED STATES PATENT OFFICE.

JOHN LOUIS ROLLAND, OF PARIS, FRANCE.

MACHINE FOR KNEADING DOUGH.

Specification of Letters Patent No. 12,217, dated January 9, 1855.

*To all whom it may concern:*

Be it known that I, JOHN LOUIS ROLLAND, of the city of Paris, in the Empire of France, have invented certain new and useful Improvements in Machines for Kneeding Dough, of which the following is a clear and exact description, reference being had to the annexed drawings, making part of the specification.

For these improvements Letters Patent have been granted to me by the Government of France, dated 11th of April 1851.

Figure 2:
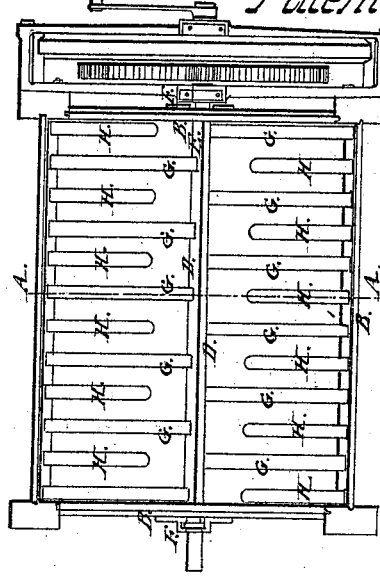
Figure 1:
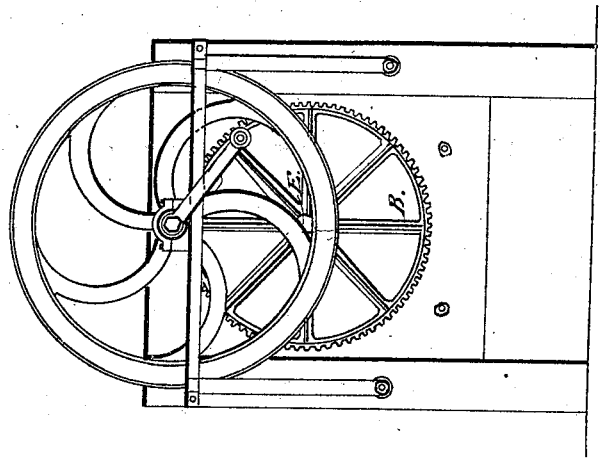
Figure 3:
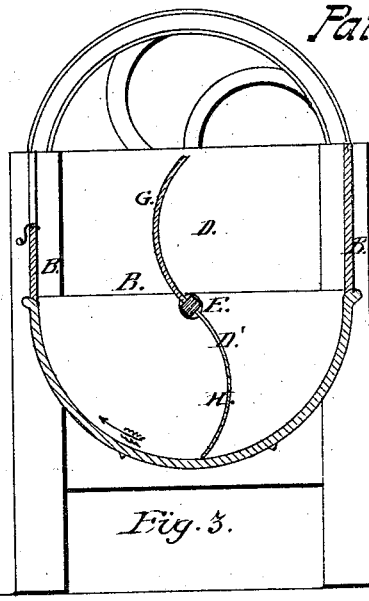

Figure 1 represents a side view of the machine; Fig. 2, a top view; Fig. 3, a section upon the line A A of Fig. 2; Figs. 4, 5, 6, 7, 8, 9, 10, 11, 12, 13, 14, 15, 16, 17, 18 and 19 are modifications of the same.

From long experience and experiments I have found that the machines hitherto constructed and used for kneading dough, do not perform the operation of kneading in a similar manner to that done by hand. It is not sufficient that the flour, yeast, water, are only mixed together, the dough requires also to be drawn out, worked and divided, so that all parts of the dough are well mixed together, and that they come in contact with the air, in order to be brought to the proper condition for baking.

To obtain the proper result by means of machines, I have made the present invention which consists in the use of two open frames fixed to an axis. Within each frame there are a number of long and short blades—the frames work within a trough and are set in motion by a suitable gearing.

To enable others skilled in the art to make and use my invention, I will proceed to describe the manner in which it is constructed and operated.

B (see Figs. 1, 2, 3) is the trough with a cylindrical bottom, which may be placed upon legs or other supports, it may be of wood lined with sheet metal, or made entirely of metal.

The axis E of the working or kneading frame rests in boxes F F which are secured to the sides B B of the trough; to the axis E are fixed the frames D D. These frames may be straight or curved in the form of the letter S as represented in Fig. 3, and are composed of several long and short blades. The long blades G G G G are fixed to the axis, and on their extreme ends to a horizontal bar I, as shown in Fig. 2. Between each pair of long blades, there are fixed shorter ones.

The short blades H H H H are fixed to the horizontal bars I I, their ends are rounded up. The edges of the long as well as of the short blades may be made sharp or blunt, as the nature of the dough may require it. The frames are set in motion by means of cog wheels, fly wheels, or other mechanical contrivances. From this peculiar arrangement of the frames, it will be seen that after the flour, yeast and water have been gradually formed into dough the frame, by means of the horizontal crossbar, lifts the dough from the bottom of the trough, and in carrying it forward in the direction of the arrow, the dough passes through the spaces between the long and short blades, and is drawn out in thin bands, until the frame rises gradually to a horizontal position when the dough falls back into the trough again, when it is again carried forward and divided, drawn out and worked by the succeeding frame.

Figure 4:
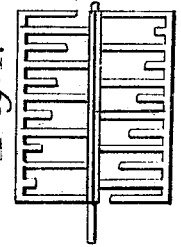
Figure 17:
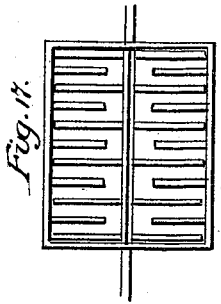
Figure 11:
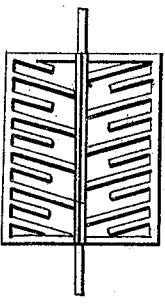

The frame and the position and number of the blades may be modified according to the nature of the dough. We give here a number of modifications:

Fig. 4.—Here the length of the short blades is varied. They are inversely symmetric in the opposite side of the frames.

Figure 5:
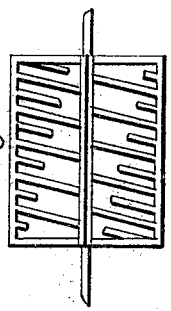
Figure 12:
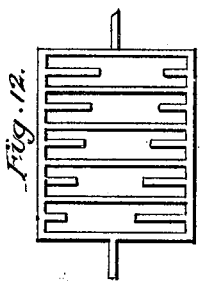

Fig. 5.—The same arrangement as in Fig. 3;—only the blades are somewhat inclined.

Figure 6:
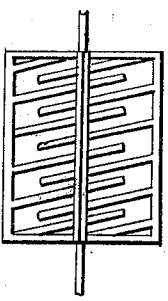
Figure 20:
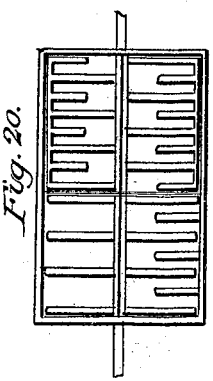
Figure 13:
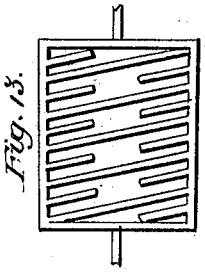

Fig. 6.—The same arrangement as in Fig. 2;—only the blades are inclined and the short ones are fixed on the axis and not on the horizontal cross bar. The blades may be also perpendicular to the axis.

Figure 7:
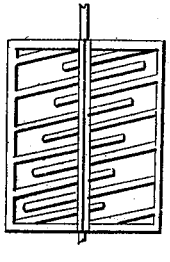

Fig. 7.—An arrangement resembling Fig. 6. The length of the short blades is on the same principle as in Fig. 4.

Figure 8:

Fig. 8.—A combination of the arrangements represented in Figs. 6 and 7.

Figure 9:
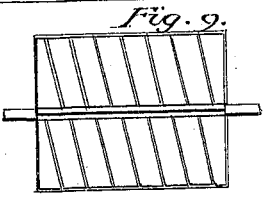
Figure 14:
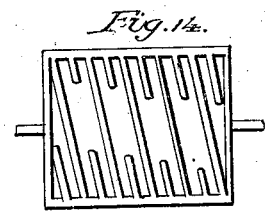
Figure 15:
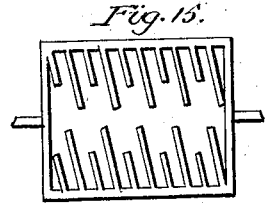
Figure 18:
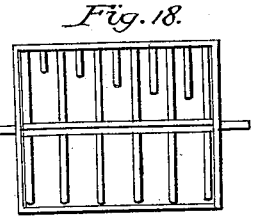
Figure 19:
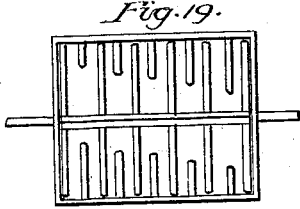
Figure 16:
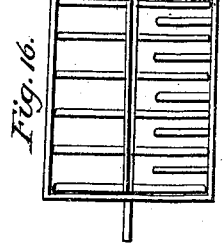

Fig. 9.—The short blades are suppressed. The long ones are sharp and in oblique position. The sharpness is wanted for hard paste, and the inclined position of the narrow blades allows the suppression of the short blades.

Figure 10:
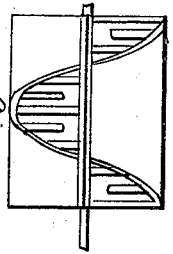

Fig. 10.—The long and short blades are arranged as in all the preceding figures, but they are not in the same plane, that is to say, each frame instead of forming a portion of a cylindrical surface, forms a portion of a helicoid. In this case as well as in all the others, one or two frames may be used.

Figs. 11, 12, 13, 14, 15.—In these contrivances the axis is suppressed and short gudgeons are fixed to the side of the frame. The sides of the frame to which the gudgeons are fixed may be straight or shaped like S.

Figs. 16, 17, 18 and 19.—Arrangements adapted for very hard dough, especially for sea-biscuit. The axis of the agitator is provided with large blades perpendicular or oblique, and they are fixed to the axis in a straight or helicoid line. They may be made sharp or blunt.

What I claim as my invention and desire to secure by Letters Patent is—

The use of open frames for kneading dough composed alternately of long and short blades projecting inwardly from the cross bars, and operating in the manner substantially as set forth.

Paris December 12th 1856.

ROLLAND.

Witnesses:
F. WERMUTH,
L. CLOUET.